(12) United States Patent
Antrim et al.

(10) Patent No.: US 6,687,351 B1
(45) Date of Patent: Feb. 3, 2004

(54) METHOD FOR PROVIDING TELEPHONE SERVICES FOR COMMERCIAL CLASSES OF SERVICE

(75) Inventors: Todd W. Antrim, Newnan, GA (US); Curtis M. Abrue, Cumming, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/454,848

(22) Filed: Dec. 7, 1999

(51) Int. Cl.[7] .......................... H04M 15/00; H04M 7/00
(52) U.S. Cl. ............. 379/157; 379/114.05; 379/201.01; 379/204.03; 379/207.11; 379/225; 379/231
(58) Field of Search ............................. 379/111, 114.01, 379/114.05, 133, 137, 201.01, 201.02, 201.03, 207.02, 221.08, 225, 232, 157, 156, 201.12, 207.11, 226, 227, 231, 234; 370/271

(56) References Cited

U.S. PATENT DOCUMENTS

| | | | | |
|---|---|---|---|---|
| 5,430,719 A | | 7/1995 | Weisser, Jr. | |
| 5,539,817 A | * | 7/1996 | Wilkes | 379/230 |
| 5,771,279 A | * | 6/1998 | Cheston, III et al. | 379/93.17 |
| 5,881,131 A | * | 3/1999 | Farris et al. | 379/27 |
| 5,943,409 A | | 8/1999 | Malik | |
| 5,970,130 A | * | 10/1999 | Katko | 379/201.01 |
| 6,061,439 A | * | 5/2000 | Bleile et al. | 379/201 |
| 6,243,373 B1 | * | 6/2001 | Turock | 370/352 |

\* cited by examiner

Primary Examiner—Curtis Kuntz
Assistant Examiner—Quoc D. Tran
(74) Attorney, Agent, or Firm—Kirkpatrick & Lockhart LLP

(57) ABSTRACT

A method, such as a method for doing business. The method includes providing telecommunications dialing features for commercial classes of telephone service. The method may include providing the telecommunications dialing features for commercial classes of telephone service on dedicated phone lines, such as a T-1 circuit. The method may also include charging a customer for providing the telecommunications dialing features for commercial classes of dedicated telephone service. According to one embodiment, the method includes charging the customer a fee on a periodic basis for the dialing features.

11 Claims, 2 Drawing Sheets

METHOD FOR PROVIDING TELEPHONE SERVICES FOR COMMERCIAL CLASSES OF SERVICE

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention is directed generally to telephone network service and, more particularly, to a method for providing certain telecommunications dialing features for commercial classes of dedicated telephone service.

2. Description of the Background

Telephone service companies typically provide enhanced telecommunications dialing features to residential and certain limited classes of business customers. These dialing features include call waiting, speed dialing, call return (*69), etc. These features are sometimes referred to as Touchstar® features, a registered service mark of BellSouth Corporation, Atlanta Ga. Residential and certain limited business customers may access the various dialing features by dialing a feature code specific to the desired feature. For example, a residential customer wishing to use the call return feature may dial, for example, *69, on a telephone using touch tone signaling, whereupon the customer may hear an announcement of the telephone number of the last incoming caller. Additionally, the customer may be presented with the option of calling back the directory number associated with the last incoming caller by dialing another feature code. Thus, residential and certain limited business customers may use the automatic recall service to screen calls or when the customer is unable to answer a call before the calling party hangs up. The feature may also be used when the customer does not know the directory number of the caller, but wishes to call back the calling party.

Such enhanced telecommunications dialing features, however, are not available for some commercial classes of service. Specifically, those features are not available for commercial classes of dedicated telephone service. Accordingly, there exists a need for a method for providing such enhanced telecommunications dialing services for commercial classes of dedicated telephone service.

BRIEF SUMMARY OF INVENTION

The present invention is directed to a method, such as a method for doing business, of providing telecommunications dialing features for commercial classes of dedicated telephone service. The dialing features may be offered on dedicated phone lines such as a T-1 trunk circuit or a dedicated DS1 line. The method may also include charging a customer fee for providing the telecommunications dialing features for commercial classes of dedicated telephone service.

The present invention represents an advancement over the prior art by providing enhanced telecommunications dialing features for commercial classes of dedicated telephone service. These and other benefits and advantages of the present invention will be apparent from the description of the invention hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
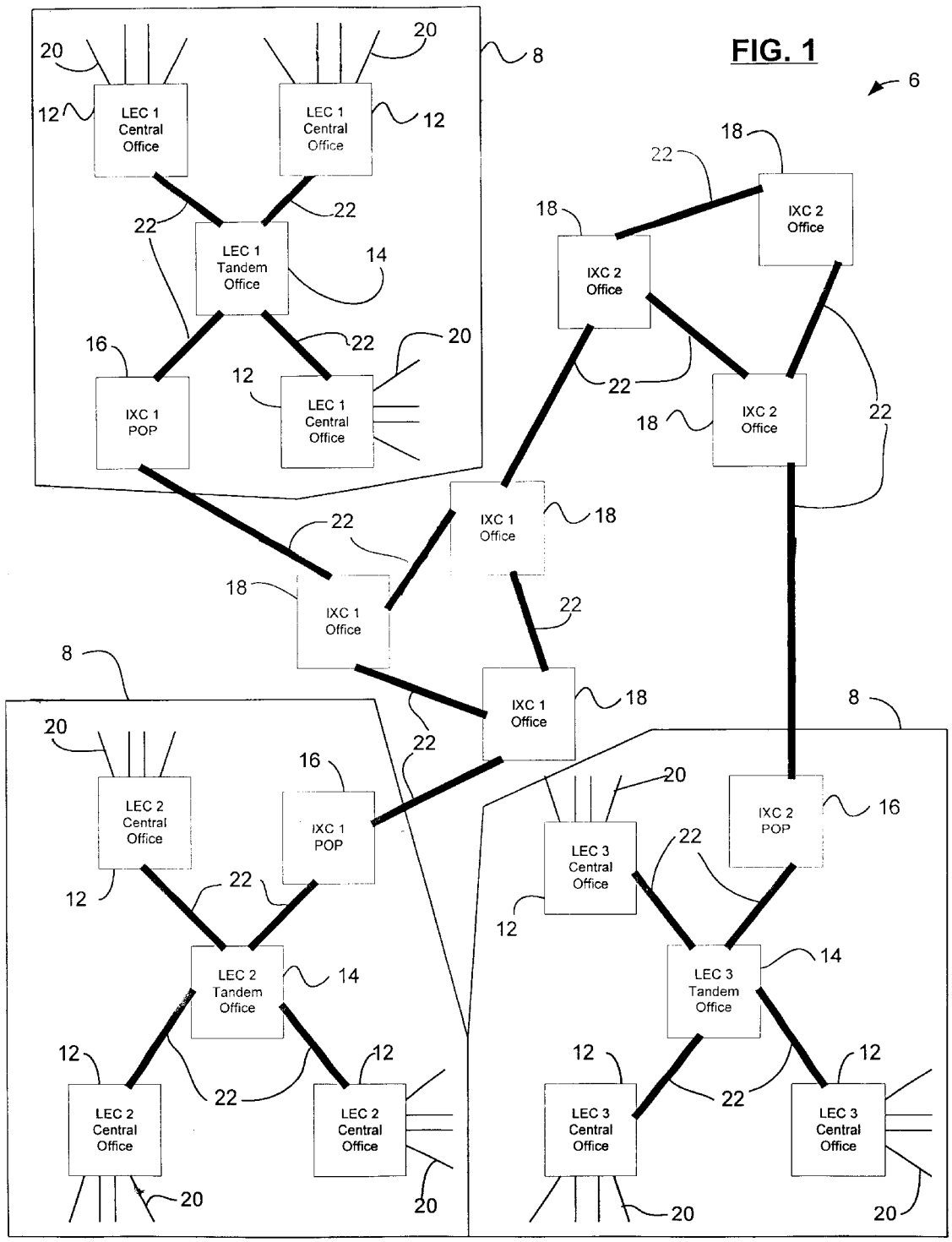
FIG. 1 is a block diagram illustrating a public switched telephone network (PSTN)

FIG. 1 is a block diagram illustrating a typical public switched telephone network (PSTN) 6. The PSTN 6 includes a number of geographic regions 8 set up to differentiate local and long distance calls. These regions 8 are typically referred to as Local Access and Transport Areas (LATAs). Each LATA 8 is serviced by at least one Local Exchange Carrier (LEC). Telephone calls between parties within a particular LATA 8, i.e., local telephone calls, are handled by the LEC. Calls between parties in different LATAs 8 are routed from the LECs for the LATAs 8 to an Interexchange Carrier (IXC).

Within each LATA 8 is a number of Local Exchange Carrier (LEC) central offices 12. Each LEC central office (CO) 12 is connected to a tandem office 14 for the particular LATA 8, also called a "toll office." The tandem offices 14 may switch calls between LEC central offices 12 within the LATA 8 that do not have a direct connection. Each LATA 8 may also include an IXC Point of Presence (POP) 16 to connect the LEC tandem office 14 for the particular LATA 8 to a long distance carrier. To provide long distance service, the PSTN 6 includes a number of IXC offices 18. The IXC offices 18 may be connected to other IXC offices 18 or to LEC tandem offices 14 via the IXC POP 16. Customer premises are connected to the PSTN 6 via subscriber lines 20. The LEC central offices 12, LEC tandem offices 14, IXC POPs 16, and IXC offices 18 may be connected by trunk lines 22, such as for example, SS7 trunk lines.

The PSTN 6 may include variations on the embodiment illustrated in FIG. 1. For example, the PSTN 6 illustrated in FIG. 1 includes one LEC tandem office 14 per LATA 8. However, multiple LEC tandem offices 14 may service a particular LATA 8. In addition, for customers who receive and/or send a large amount of local or long distance traffic, such as some commercial customers, the subscriber lines 20 for those customers may be connected directly to an IXC and bypass the LEC, or connect directly to the LEC for local traffic.

Figure 2:
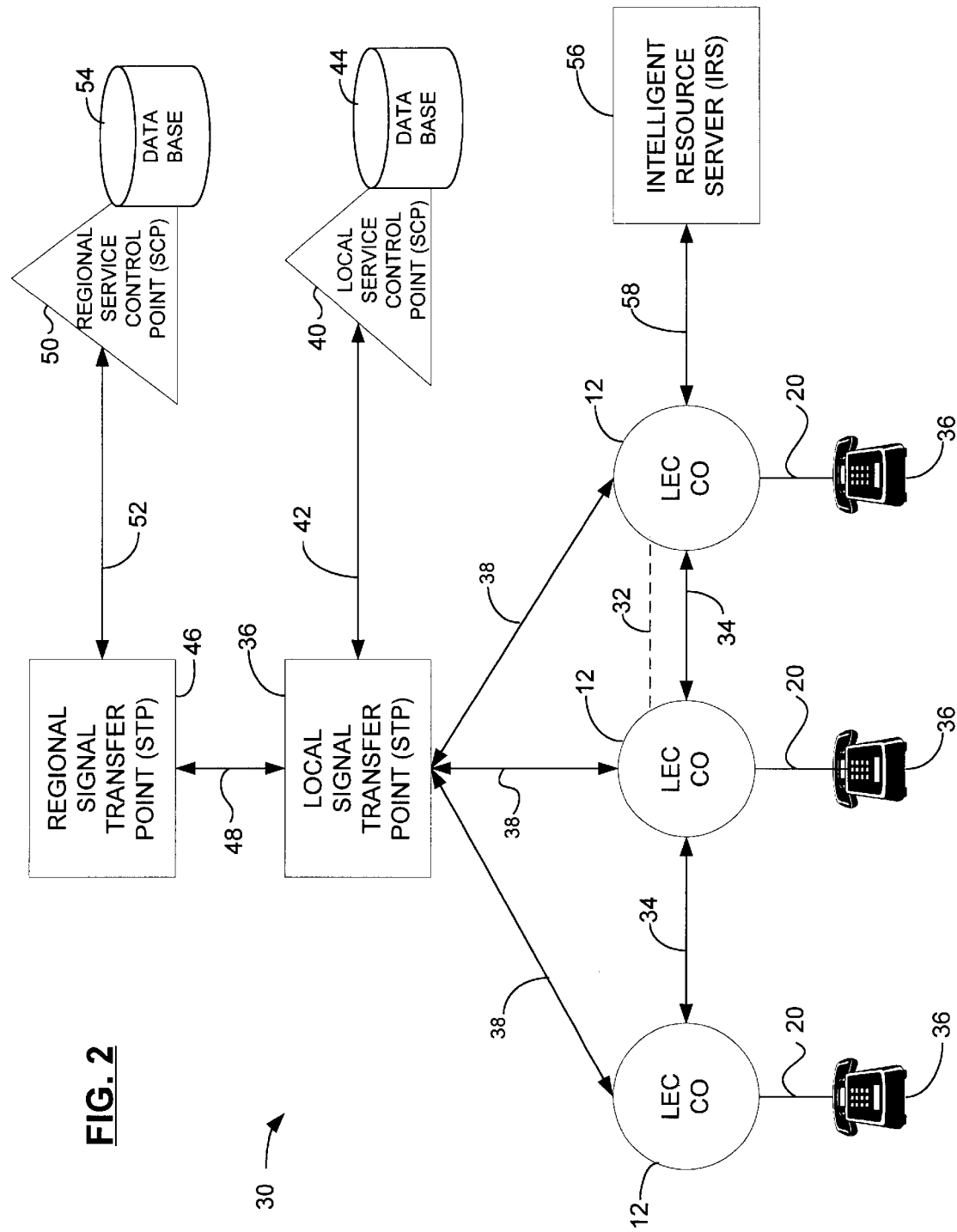
FIG. 2 is a block diagram of an Advanced Intelligent Network that may be incorporated into the PSTN of FIG. 1.

FIG. 2 is a block diagram of an Advanced Intelligent Network (AIN) 30 which may be integrated with the PSTN 6 of FIG. 1. AINs are typically utilized by LECs to allow the LECs to provide call processing features and services that are not embedded within conventional switching circuits of the PSTN 6. For the AIN 30 illustrated in FIG. 2, the LEC central offices 12 of the PSTN 6 of FIG. 1 may include service switching point (SSP) switches. The dashed line 32 between the LEC central offices 12 indicates that the number of LEC central offices 12 for a particular LEC may vary. Interconnecting the LEC central offices 12 are data links 34, which may be, for example, trunk circuits.

As discussed hereinbefore, each LEC central office 12 has a number of subscriber lines 20 connected thereto. The subscriber lines 20 may be, for example, conventional twisted pair loop circuits connected between the telephone drop for the customer premises and the LEC central office (CO) 12 or trunk circuits, such as T-1 trunk circuits, interconnecting the customer premises and the LEC CO 12. Typically, the number of subscriber lines 20 connected to each LEC CO 12 is on the order of ten thousand to one hundred thousand lines. Each of the subscriber lines 20 is connected to a terminating piece of customer premises equipment, represented in FIG. 2 by telephones 36. Alternatively, the terminating piece of customer premises equipment may be, for example, a telecopier, a personal computer (PC), a modem, or a private branch exchange (PBX) switching system.

According to the AIN 30 illustrated in FIG. 2, each LEC CO 12 is connected to a local signal transfer point (STP) 36 via data links 38. The data links 38 may employ, for example, an SS7 switching protocol. The local STP 36 may be a multi-port high speed packet switch that is programmed to respond to the routing information in the appropriate layer of the switching protocol, and route the data packets to their intended destination.

One of the intended destinations of the data packets from the local STP 36 may be a local service control point (SCP) 40. The local STP 40 may be in communication with the local SCP 36 via a data link 42, which may, for example, also employ the SS7 switching protocol. The local SCP 40 may be an intelligent database server, such as an Intelligent Network Service Control Point available from Lucent Technologies Inc., Murray Hill, N.J., having associated with it a network database 44 for storing network data. The intelligent functionality of the local SCP 40 may be realized by programs, such as a Service Program Applications (SPA), which are executed by the local SCP 40. The local SCP 40 may be employed to implement high volume routing services, such as call forwarding and 800 number translation and routing. The local SCP 40 may also be used for maintenance of and providing access to the network databases for authorization of billing, such as credit card validations. In addition, another of the functions of the local SCP 40 may be to implement a particular subscriber's enhanced calling features or services. The local SCP 40 may perform this function in conjunction with the associated network database 44, which may store subscriber information, such as subscriber call management profiles, used in providing the enhanced calling features and services. Such enhanced calling services may include call forwarding, call screening and blocking for both incoming and outgoing calls, and remote event notification.

Another of the intended destinations of the data packets from the local STP 36 may be a regional STP 46. The regional STP 46 may be in communication with the local STP 36 through a data link 48, which may, for example, employ the SS7 switching protocol. The regional STP 46 may be in communication with a regional SCP 50 via a data link 52, which may be physically and functionally the same as the data link 42. Associated with the regional SCP 50 may be a network database 54 for storing network data. The regional STP 46 and the regional SCP 50 may be used for routing and servicing calls among different LECs.

The AIN 30 illustrated in FIG. 2 also includes an intelligent resource server (IRS) 56. The IRS 56 may be, for example, a service node such as a compact service node (CSN) from Lucent Technologies Inc., Murray Hill, N.J., although the IRS 56 may be any other AIN-compliant IRS such as, for example, an AIN/IP (Intelligent Peripheral) IRS from Nortel Networks Corp., Montreal, Quebec. The IRS 56 may be similar to the local SCP 40, and may additionally include voice and DTMF signal recognition devices and voice synthesis devices. The IRS 56 may be used primarily when some enhanced feature or service is needed that requires an audio connection to the call such as, for example, call return, or when transfer of a significant amount of data to a subscriber over a switched connection during or following a call. The IRS 56 may be connected to one or more LEC central offices 12 via a data link 58, which may be, for example, an Integrated Service Digital Network (ISDN) or a T-1 switching trunk circuit.

In an Advanced Intelligent Network such as the AIN 30, in order to keep the processing of data and calls as simple as possible at the switches, such as at the SSP switches of the LEC central offices 12, a set of triggers are defined at the SSP switches for each call. A trigger in the AIN is an event associated with a particular subscriber line 20 that generates a data packet to be sent from the LEC CO 12 to, for example, the local SCP 40 via the local STP 36. The triggers may be an originating trigger for calls originating from the subscriber premises or terminating triggers for calls terminating at the subscriber premises. The trigger causes a message in the form of a query to be sent from the LEC CO 12 to the local SCP 40. The local SCP 40 in turn may interrogate the database 44 to determine whether some customized call feature or enhanced service should be implemented for the particular call based on the subscriber's call management profile, stored in the database 44, or whether conventional dial-up telephone service should be provided.

The results of the database inquiry may be sent back from the local SCP 40 to the LEC CO 12 via the local STP 36. The return packet includes instructions to the LEC CO 12 as to how to process the call. The instructions may, for example, be to take some special action as result of a customized calling service or enhanced feature. For example, for a calling feature requiring the voice synthesis capabilities of the IRS 56, the return instructions to the LEC CO 12 from the local SCP 40 may be to route the call to the IRS 56. In addition, the return instructions from the local SCP 40 may simply be an indication that there is no entry in the database 44 that indicates anything other than conventional telephone service should be provided for the call. The query and return messages may be formatted, for example, according to conventional SS7 TCAP (Transaction Capabilities Application Part) formats.

The AIN 30 illustrated in FIG. 2 may further include other network elements which are not included in FIG. 2 for purposes of clarity. For example, the local and regional STPs 36, 46 and SCPs 40, 50 may be provided in mated redundant pairs for enhancing network reliability. In addition, the AIN 30 may include additional IRSs 36. Also, the AIN 30 may include one or more 1AESS (Automatic Electronic Switching System) Network Access Points (NAPs) in communication with, for example, the local STP 36 or the regional STP 46, which may be programmed to detect the trigger conditions.

As discussed hereinbefore, the customer premises are connected to the LEC central offices 12 of the PSTN 6 via the subscriber lines 20. The subscriber lines 20 for a customer premises, typically referred to as a 1FR line for residential use and 1FB line for business use, may be, for example, a dedicated conventional telephone line loop, connected to one of the LEC central offices 12 within the LATA 8 in which the customer is located. However, because some commercial customers require multiple telephone lines, the subscriber line 20 for a commercial customer premises may be, for example, a T-1 link or megalink. A T-1 link is a 1.544 Mbps point-to-point dedicated, digital circuit which interleaves twenty-four 64-kbps voice or data channels (or lines), using time division multiplexing. Accordingly, some commercial customer premises may include twenty-four channels. As discussed hereinbefore, a commercial customer may, for example, use some or all of the twenty-four channels to connect to an LEC CO 12. In addition, some or all of the twenty-four channels for a T-1 trunk circuit could bypass the LEC central offices 12 for connection to, for example, an IXC 18.

Commercial customers using T-1 lines typically pay a flat fee on a periodic basis, such as monthly, based on the length of the line. To facilitate communications within its private network, the commercial customer premises may include a private branch exchange (PBX) switching system to interface via the subscriber line 20 with the LEC CO 12.

The LEC for a particular LATA 8 may provide enhanced telecommunications dialing service features for customers. These feature may include, for example, call tracing, call waiting, repeating calling, speed dialing, and return calling (commonly referred to as "*69"). A customer may activate these features by dialing a feature code specific to the desired feature. The AIN 30 for the LEC may initiate the processing of the enhanced calling feature according to a feature code trigger. For example, a customer may utilize the return calling feature by dialing a certain feature code such as "*69," which causes the LEC CO 12 to send a TCAP query message to the local SCP 40, via the local STP 36, in response to the detection of the feature code. The local SCP 40 may send a TCAP response message to the LEC CO 12 to route the call, for example, to the IRS 56 to provide the functionality for the return calling feature. The customer may then, for example, hear an announcement of the last telephone number that called. Additionally, the customer may, for example, be offered the option of placing a call to that number by dialing another feature code. Such enhanced telecommunications dialing services are typically available to customers using touch-tone signaling utilizing, for example, Dual-Tone MultiFrequency (DTMF) audio signals.

Customers may be charged for accessing these dialing services by, for example, subscribing to the services on, for example, a monthly basis, or upon each activation of one of the various dialing features. For example, for speed dialing, a customer may pay a monthly charge to allow the customer to program their phone line to dial frequently called local or long distance numbers by dialing, for example, one or two digit feature codes. Additionally, for call tracing, the customer may pay an activation charge each time the number of the last received call is traced and sent to the LEC service center. Also, for return calling, the customer may pay a periodic fee or could be charged on a per-use basis.

For residential customers, the dialing features are assigned to the customer's phone line, i.e., 1FR line. For billing purposes, the dialing features may be sold according Network Access Registers (NARs) assigned to the telephone number of the customer. Customers are typically billed according to Universal Service Order Codes (USOCs). A USOC is typically five character alphanumeric code used by LECs and which describes, for example, the particular product or services billed for. The dialing features may be billed to the residential or business customers according to Feature Identification codes (FIDs) used by the USOCs. The FIDs may be switching instructions for the LEC central offices 12 for implementing the enhanced calling features. Each dialing feature for 1FB or 1FR lines may have its own FID, which are assigned to the USOC for each 1FB or 1FR line.

The present invention contemplates a method for providing enhanced telecommunications dialing features for commercial classes of dedicated telephone service, such as for dedicated T-1 lines. According to one embodiment, the dialing features may be provided for commercial classes of dedicated telephone service by establishing FIDs for the dialing features for T-1 lines to be used by the USOCs for commercial classes of business. As discussed hereinbefore, where the commercial premises are connected to the PSTN 6 by a T-1 link, the commercial customer is typically charged a monthly fee based on, for example, the length of the line. According to one embodiment of the present invention, the commercial customer using a dedicated T-1 link may be charged a flat fee on a periodic basis, such as monthly, for a particular dialing feature on all the T-1 channels, rather than charging the commercial customer for the features for each channel of the T-1 circuit.

The present invention may be implemented, for example, by establishing a FID, or several FIDs, for one or more dialing enhanced calling features or services to be provided on a commercial class of dedicated telephone service. Rather than being assigned to a particular telephone number for a subscriber line 20, according to the present invention the FID(s) may be assigned to the T-1 group of lines for commercial classes of dedicated telephone service. The FID(s) may be established in a manner consistent with that which is well known in the art of telecommunications and may represent features such as call waiting, speed dialing, and call return. Other features, of course, may also be included. Furthermore, a NAR may be assigned to the dedicated commercial telephone line group. The NAR may have been assigned to the line(s) before the FIDs were established, such as for existing lines and customers, or the NAR may be assigned after the FIDs are established, for new lines and customers. One or more of the FIDs are then associated with one or more NARs, so as to establish the dialing features for those lines. NARs which were assigned to lines before the FIDs are established may be updated with one or more of the FIDs. Conversely, NARs which are assigned after the FIDs are established may be initially implemented with one or more of the FIDs.

After the FIDs are associated with a NAR, the users of the line may enjoy the benefits of the dialing features corresponding to the FIDs. Those features may be implemented, with the use of the FIDs, by the existing telecommunications system already in place and discussed hereinabove. The provider of the telecommunications services may, for example, bill the users of the lines in a manner customary in the industry. Such billing may be accomplished, for example, by identifying the FIDs for that line or group of lines of the dedicated T-1 link, assigning the FIDs to a USOC for that line(s), and billing the customer according to the USOC, or an equivalent. The bill, of course, may include charges other than those for the enhanced calling features, such as charges for local and long distance services. As discussed above, such billing for the enhanced dialing features for the dedicated telephone service may be, for example, based upon a per usage or upon a fixed fee per unit time basis.

Although the present invention will be described herein with respect to certain embodiments, those of ordinary skill in the art will recognize that many modifications and variations of the present invention may be implemented. The foregoing description and the following claims are intended to cover all such modifications and variations.

What is claimed is:

1. A method of providing an enhanced telecommunications dialing feature on a commercial class of dedicated telephone service, comprising:

establishing a feature identification code (FID) for the dialing feature on the commercial class of dedicated telephone service;

assigning a network access register (NAR) to a dedicated commercial telephone line, wherein the dedicated commercial telephone line is for at least one terminating piece of customer premises equipment that is in communication with a telecommunications service provider central office; and associating the FID with the NAR assigned to the dedicated commercial telephone line;

wherein the enhanced telecommunications dialing feature is provided by the telecommunications service provider at the central office.

2. The method of claim 1, further comprising:

assigning a plurality of NARs to a plurality of dedicated commercial telephone lines; and associating the FID with the plurality of NARs.

3. The method of claim 1, wherein:

assigning a NAR includes assigning a NAR to a plurality of dedicated commercial telephone lines; and associating the FID includes associating the FID with the NAR assigned to the plurality of dedicated commercial telephone lines.

4. The method of claim 1, wherein the dialing feature is selected from a group consisting of call waiting, speed dialing, and call return.

5. The method of claim 1, further comprising:

establishing a plurality of FIDs for a plurality of calling features; and associating at least one of the FIDs with the NAR assigned to the dedicated commercial telephone line.

6. The method of claim 1, wherein establishing the FID occurs after assigning the NAR to the dedicated commercial telephone line.

7. The method of claim 1, wherein establishing the FID occurs before assigning the NAR to the dedicated commercial telephone line.

8. The method of claim 1, further comprising billing a customer associated with the dedicated commercial telephone line for the dialing feature.

9. The method of claim 8, wherein billing includes:

identifying the FID associated with the dialing feature;

assigning the FID to a Universal Service Order Code (USOC) for the telephone line; and billing the customer according to the USOC.

10. The method of claim 8, wherein billing the customer is based on a per usage basis of the dialing feature.

11. The method of claim 8, wherein billing the customer is based on a fixed fee per unit time for the dialing feature.

* * * * *